United States Patent
Wada

(10) Patent No.: US 7,535,651 B2
(45) Date of Patent: May 19, 2009

(54) ZOOM LENS AND IMAGE PICKUP APPARATUS HAVING THE SAME

(75) Inventor: Ken Wada, Shioya-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 11/846,412

(22) Filed: Aug. 28, 2007

(65) Prior Publication Data

US 2009/0009883 A1    Jan. 8, 2009

(30) Foreign Application Priority Data

Aug. 31, 2006    (JP) ............................ 2006-235427

(51) Int. Cl.
*G02B 15/14* (2006.01)
(52) U.S. Cl. ...................... 359/682; 359/680
(58) Field of Classification Search ............... 359/680, 359/682, 683, 685, 689
See application file for complete search history.

(56) References Cited

U.S. PATENT DOCUMENTS

| | | | |
|---|---|---|---|
| 5,009,491 A | 4/1991 | Hata | |
| 6,498,687 B1 | 12/2002 | Sekita | |
| 6,545,819 B1 | 4/2003 | Nanba | |
| 7,042,651 B2 | 5/2006 | Kuba et al. | |
| 7,046,453 B1 * | 5/2006 | Chang et al. | 359/689 |
| 7,262,924 B2 * | 8/2007 | Sekita | 359/708 |
| 7,289,273 B2 * | 10/2007 | Mihara | 359/676 |
| 2004/0150891 A1 | 8/2004 | Ichino | |

FOREIGN PATENT DOCUMENTS

JP    2004-318104    11/2004

* cited by examiner

*Primary Examiner*—David N Spector
(74) *Attorney, Agent, or Firm*—Canon USA Inc IP Div.

(57) ABSTRACT

At least one exemplary embodiment is directed to a zoom lens including, in order from an object side to an image side, a first lens unit having a negative refractive power, a second lens unit having a positive refractive power, and a third lens unit having a positive refractive power. An interval between respective adjacent lens units varies during zooming. The first lens unit includes a composite optical element. The composite optical element includes a lens element and a resin layer having an optical characteristic different from that of the lens element and laid on the lens element. The zoom lens satisfies at least one of predetermined conditions.

16 Claims, 9 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens, and more particularly, though not exclusively, a zoom lens that can be used, for example, in an image pickup apparatus.

2. Description of the Related Art

Recently, the market has desired a highly functional and small-sized image pickup apparatus (camera), such as a video camera or a digital still camera. Furthermore, the market has also desired a small optical system (imaging optical system), which is used in such a camera, having a wide angle of view and a large aperture, with a small number of lenses, and having a high optical performance.

A camera using an image sensor includes a low-pass filter and a color collection filter disposed between a rearmost lens portion and the image sensor. Accordingly, it is required that a zoom lens for use with such a camera has a relatively long back focal length.

In addition, in a camera using an image sensor for a color image, in order to prevent shading in luminance and color, it is desired that a zoom lens for use with such a camera is telecentric on the image side.

A so-called retro focus type zoom lens having a front lens unit having a negative refractive power and a rear lens unit having a positive refractive power in order from the object side to the image side is known as a zoom lens that is telecentric on the image side.

As one of such retro focus type zoom lenses, U.S. Pat. Nos. 6,545,819 and 6,498,687 each discuss a three-unit zoom lens including a first lens unit having a negative refractive power, a second lens unit having a positive refractive power, and a third lens unit having a positive refractive power in order from the object side to the image side.

In addition, U.S. Pat. No. 5,009,491 and U.S. Patent Application Publication No. US 2004/0150890 A1 each discuss a three-unit zoom lens capable of correcting various aberrations occurring due to a high zoom ratio with a third lens unit.

Moreover, Japanese Patent Application Laid-Open No. 2004-318104 and U.S. Pat. No. 7,042,651 each discuss a small-size three-unit zoom lens having a first lens unit including two lens elements.

In recent years, attempts have been made to both implement the downsizing of a camera and increase the zoom ratio of a zoom lens that is used for the camera. The method for both implementing the downsizing of a camera and increasing the zoom ratio includes a so-called lens retraction method. In the lens retraction method, the interval between lens units in a non-photographing state is reduced to an interval that is different from the interval in a photographing state so as to reduce the amount of protrusion of the lens from the camera body.

As the number of lens elements of each lens unit that constitutes a zoom lens is large, the length of each lens unit along an optical axis becomes large and, thus, the entire length of the zoom lens becomes large. In addition, when the amount of movement of each lens unit during zooming or focusing is large, the entire length of the zoom lens becomes large. As a result, a desired length of the zoom lens with the lens units retracted cannot be obtained. Accordingly, it becomes difficult to utilize the lens retraction method. That is, as the zoom ratio of a zoom lens becomes higher, the entire length of the zoom lens becomes larger, and accordingly, it becomes difficult to apply the lens retraction method.

If the number of lenses in each lens unit or the total number of lenses in the entire zoom lens is merely reduced to reduce the total length of the lenses at the time of retraction, it becomes difficult to correct aberrations, such as spherical aberration and coma, which concern a monochromatic image forming performance. Furthermore, since only a limited range of glass material can be used, it becomes highly difficult to correct or reduce chromatic aberration.

In the optical design field, the number of lenses in the entire optical system can be reduced often by using a lens having an aspheric surface. However, in the case of using an aspheric lens, aberrations related to the monochromatic image forming performance can be corrected, but it is difficult to correct or reduce chromatic aberration occurring mainly due to selection of a glass material.

In addition, as one of methods for processing a lens surface to produce an aspheric surface, there is known a method of laying a resin on a lens surface of a base lens and pressing an aspheric-shaped mold against the resin layer to form an aspheric lens. With this method, the entire length of the lens can be shortened while correcting or reducing aberrations with an aspheric lens. However, it is difficult to correct or reduce chromatic aberration unless a setting based on the difference between a material of the lens and a material of the resin is appropriately defined.

In particular, if the lens configuration of a first lens unit, whose effective diameter is generally large, is inappropriately set, it is difficult to obtain a high optical performance while downsizing the entire optical system.

SUMMARY OF THE INVENTION

The present invention is directed to a zoom lens that can be used in an image pickup apparatus (e.g., a digital still camera, a video camera, a film camera, and other image pickup apparatuses as known by one of ordinary skill in the relevant arts).

The present invention is directed to a zoom lens whose number of constituent lenses is small, whose lens total length is short, and whose various aberrations (e.g., chromatic aberration) are appropriately corrected or reduced, and to an image pickup apparatus having the zoom lens.

The present invention is also directed to a zoom lens whose number of constituent lenses is small, whose angle of view is large, which has a high zoom ratio and a high optical performance, and which is suitable for use with the lens retraction method, and to an image pickup apparatus having the zoom lens.

According to an aspect of the present invention, a zoom lens includes, in order from an object side to an image side: a first lens unit having a negative refractive power; a second lens unit having a positive refractive power; and a third lens unit having a positive refractive power, wherein an interval between the first lens unit and the second lens unit and an interval between the second lens unit and the third lens unit vary during zooming, wherein the first lens unit includes a composite optical element, wherein the composite optical element includes a lens element and a resin layer having an optical characteristic different from that of the lens element and laid on the lens element, and wherein a refractive power of the lens element ($\phi_a$), an Abbe number of a material of the lens element with respect to d-line light ($v_a$), a refractive power of the resin layer ($\phi_b$), an Abbe number of a material of the resin layer with respect to d-line light ($v_b$), and a focal length of the zoom lens at a wide-angle end ($f_w$) satisfy the following condition:

$$0 < |(\phi_a/\nu_a + \phi_b/\nu_b)f_w| < 0.00123.$$

According to another aspect of the present invention, a zoom lens includes, in order from an object side to an image side: a first lens unit having a negative refractive power; a second lens unit having a positive refractive power; and a third lens unit having a positive refractive power, wherein an interval between the first lens unit and the second lens unit and an interval between the second lens unit and the third lens unit vary during zooming, wherein the first lens unit includes a composite optical element, wherein the composite optical element includes a lens element made of a glass material and a resin layer having an optical characteristic different from that of the lens element and laid on the lens element, and wherein a focal length of the first lens unit ($f_1$), a focal length of the zoom lens at a wide-angle end ($f_w$), a radius of curvature of a surface of the composite optical element facing the object side ($R_{11}$), and a radius of curvature of a surface of the composite optical element facing the image side ($R_{12}$) satisfy the following conditions:

$$1.8 < |f_1/f_w| < 5.0, \text{ and}$$

$$-0.34 < (R_{11}+R_{12})/(R_{11}-R_{12}) < 0.20.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Figure 1:
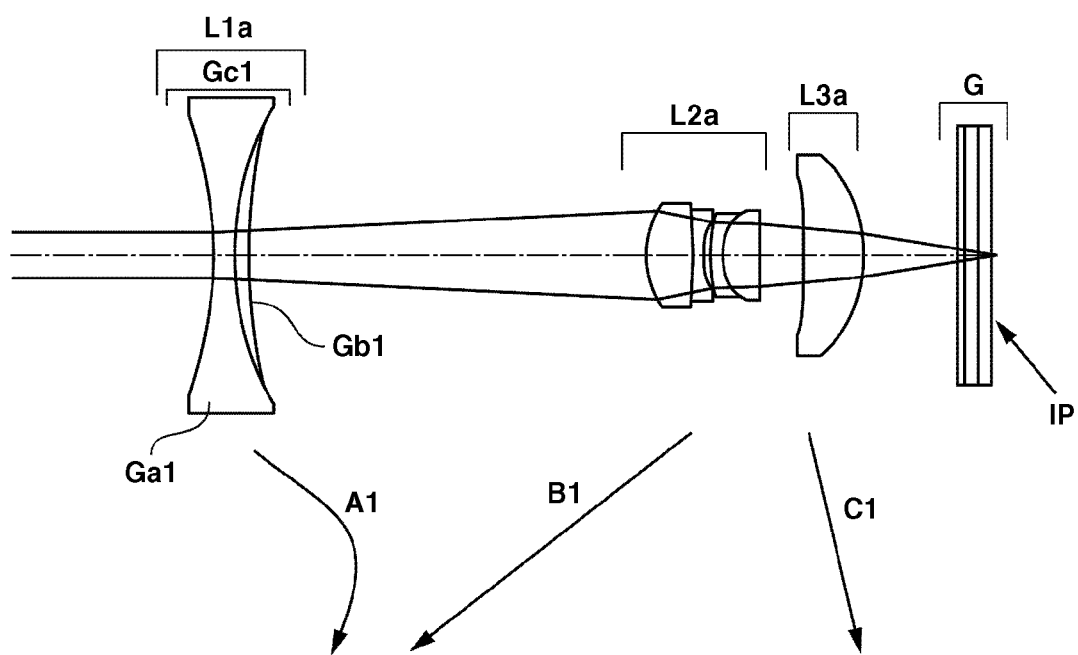
FIG. 1 is a cross section of a zoom lens according to a first exemplary embodiment of the present invention.

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein, any specific values, for example the zoom ratio and F number, should be interpreted to be illustrative only and nonlimiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Figure 2A:
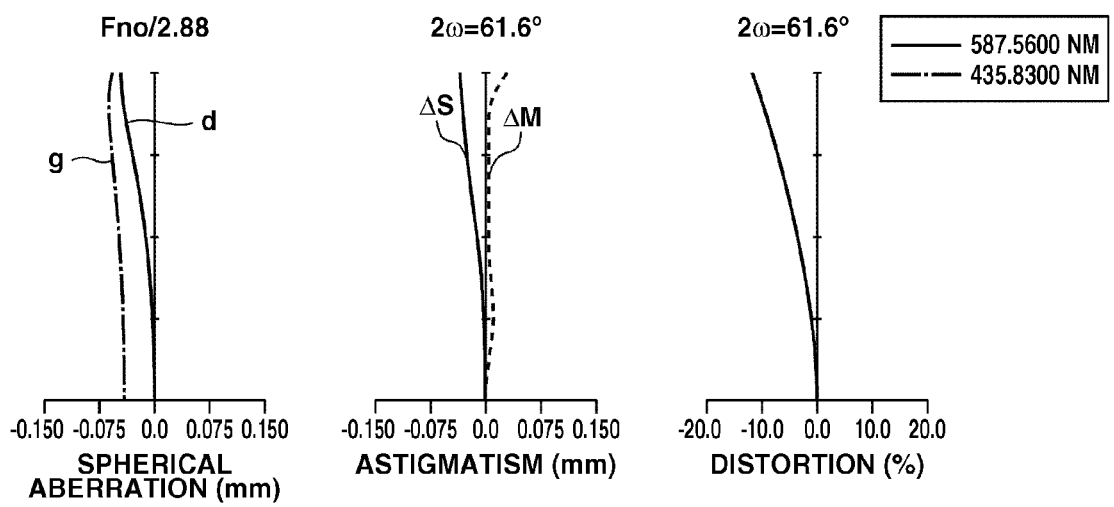
FIGS. 2A and 2B respectively illustrate an aberration chart at a wide-angle end and an aberration chart at a telephoto end for the zoom lens according to the first exemplary embodiment of the present invention.
Figure 2B:
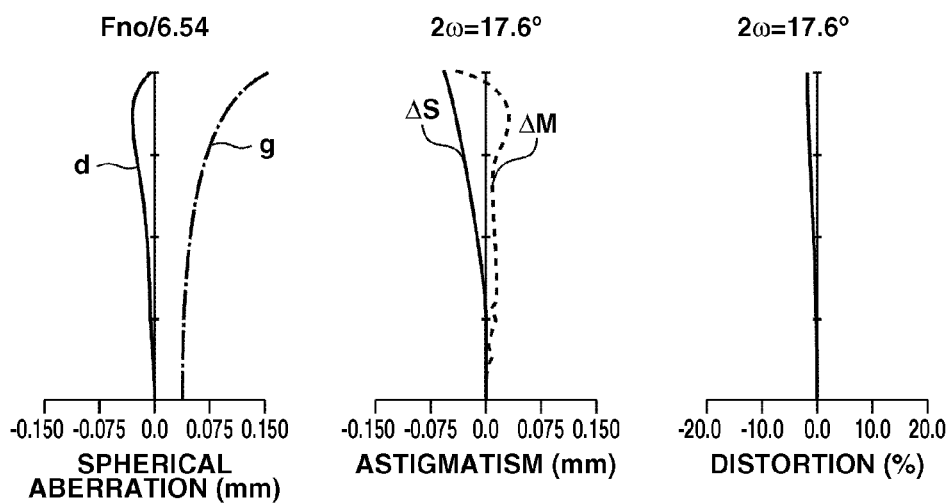

FIG. 1 is a cross section of a zoom lens at a wide-angle end (a short focal length end) according to a first exemplary embodiment of the present invention. FIG. 2A and FIG. 2B respectively illustrate an aberration chart at a wide-angle end and an aberration chart at a telephoto end (a long focal length end) for the zoom lens according to the first exemplary embodiment of the present invention. The first exemplary embodiment is directed to a zoom lens having a zoom ratio of about 3.9 and an aperture ratio ranging from about 2.9 to about 6.5.

Figure 3:
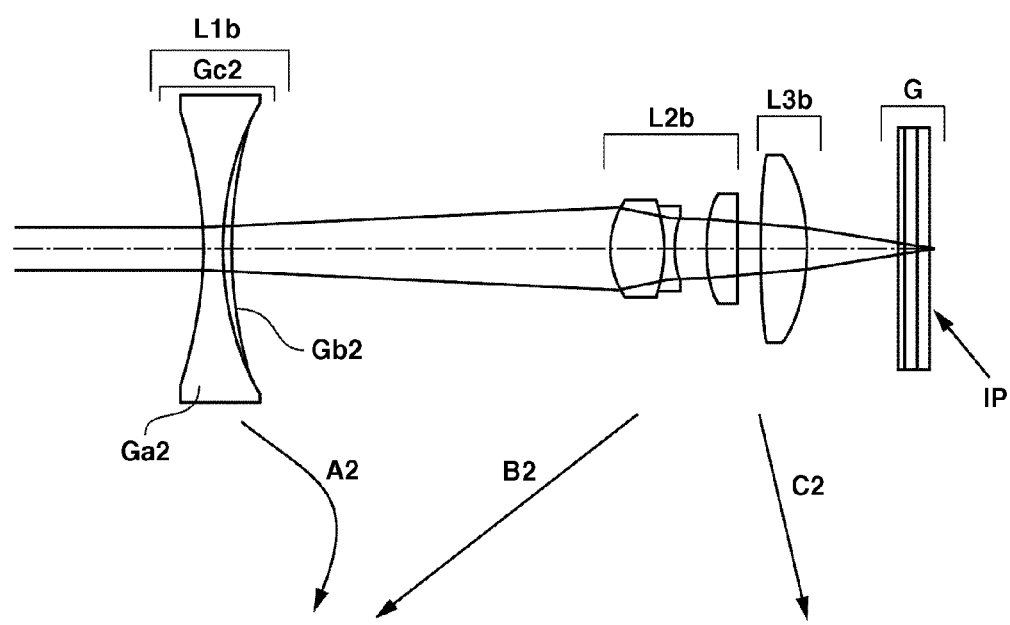
FIG. 3 is a cross section of a zoom lens according to a second exemplary embodiment of the present invention.
Figure 4A:
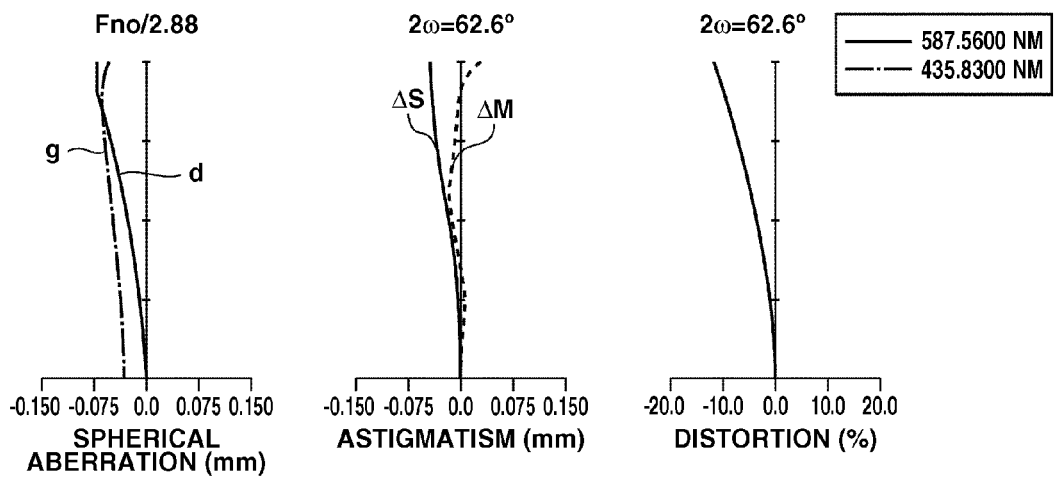
FIGS. 4A and 4B respectively illustrate an aberration chart at a wide-angle end and an aberration chart at a telephoto end for the zoom lens according to the second exemplary embodiment of the present invention.
Figure 4B:
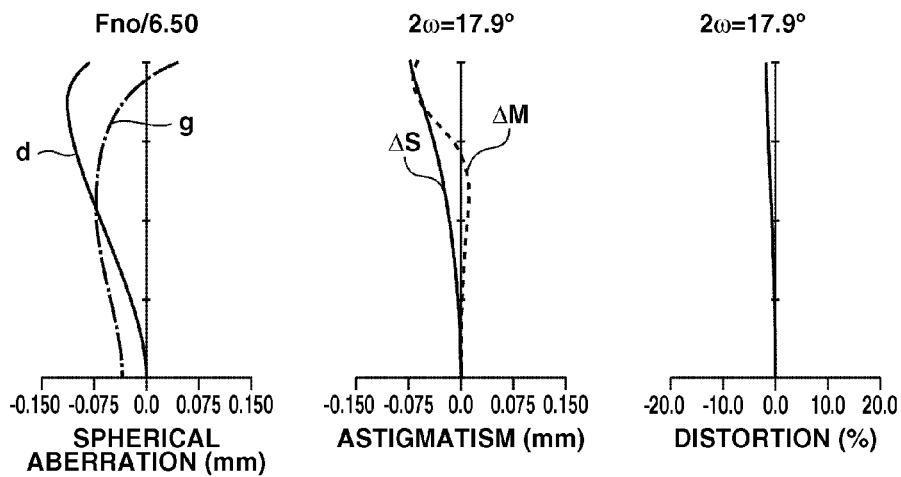

FIG. 3 is a cross section of a zoom lens at a wide-angle end according to a second exemplary embodiment of the present invention. FIG. 4A and FIG. 4B respectively illustrate an aberration chart at a wide-angle end and an aberration chart at a telephoto end for the zoom lens according to the second exemplary embodiment of the present invention. The second exemplary embodiment is directed to a zoom lens having a zoom ratio of about 3.9 and an aperture ratio ranging from about 2.9 to about 6.5.

Figure 5:
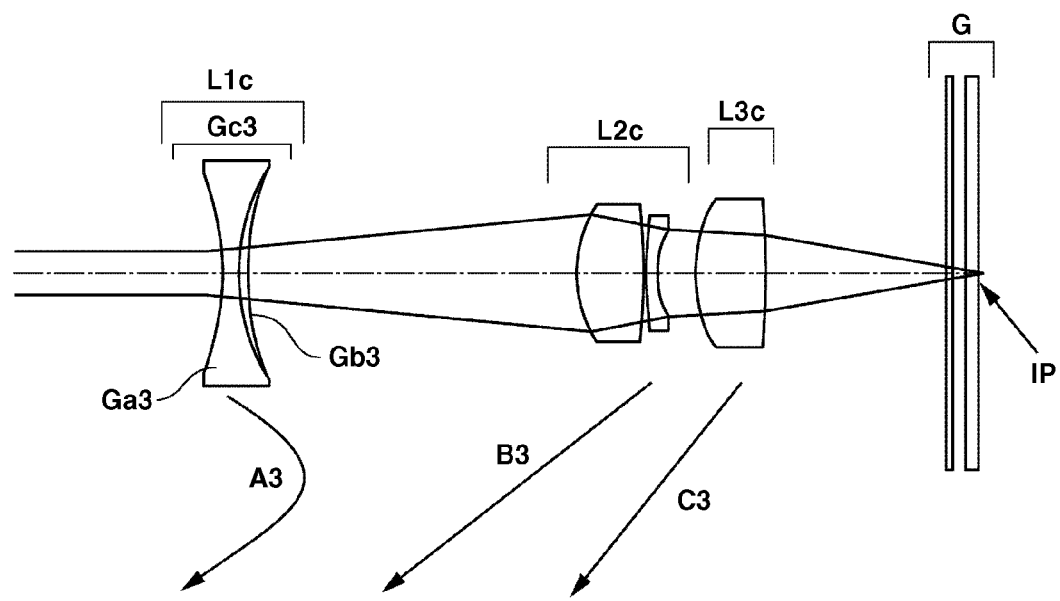
FIG. 5 is a cross section of a zoom lens according to a third exemplary embodiment of the present invention.
Figure 6A:
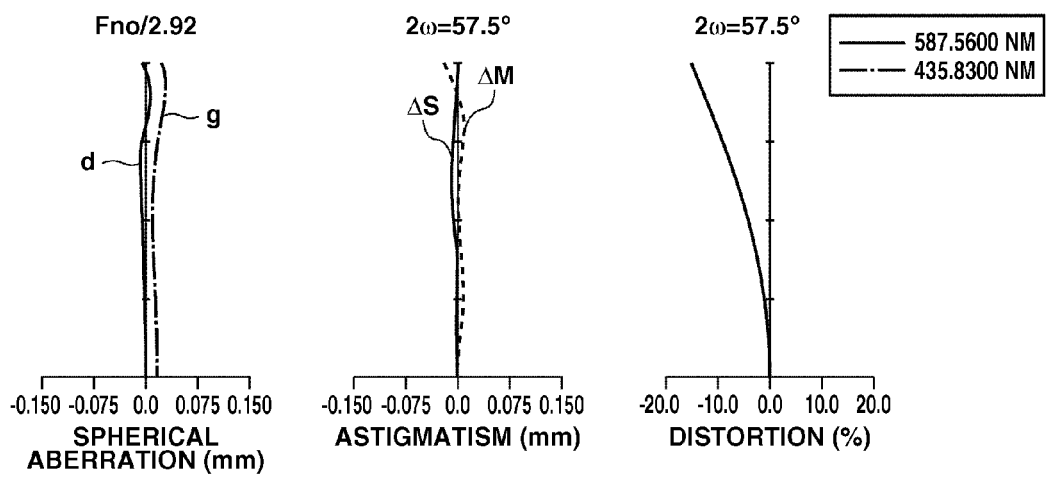
FIGS. 6A and 6B respectively illustrate an aberration chart at a wide-angle end and an aberration chart at a telephoto end for the zoom lens according to the third exemplary embodiment of the present invention.
Figure 6B:
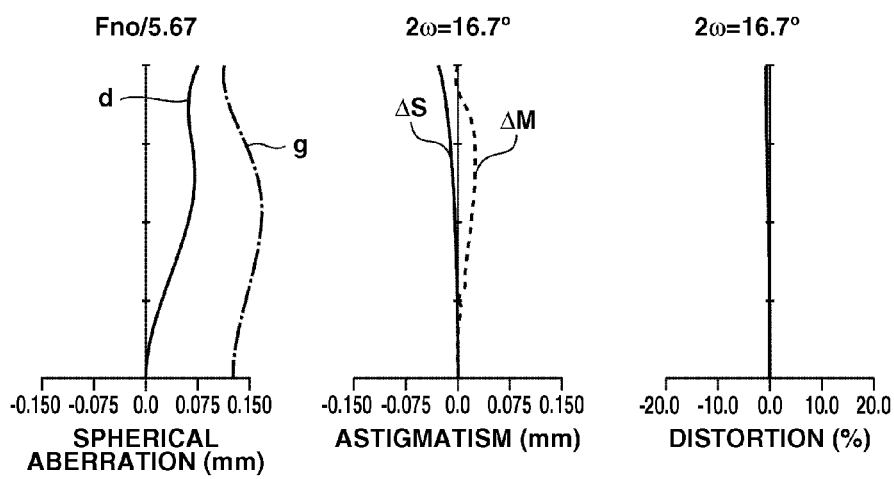

FIG. 5 is a cross section of a zoom lens at a wide-angle end according to a third exemplary embodiment of the present invention. FIG. 6A and FIG. 6B respectively illustrate an aberration chart at a wide-angle end and an aberration chart at a telephoto end for the zoom lens according to the third exemplary embodiment of the present invention. The third exemplary embodiment is directed to a zoom lens having a zoom ratio of about 3.8 and an aperture ratio ranging from about 2.9 to about 5.7.

Figure 7:
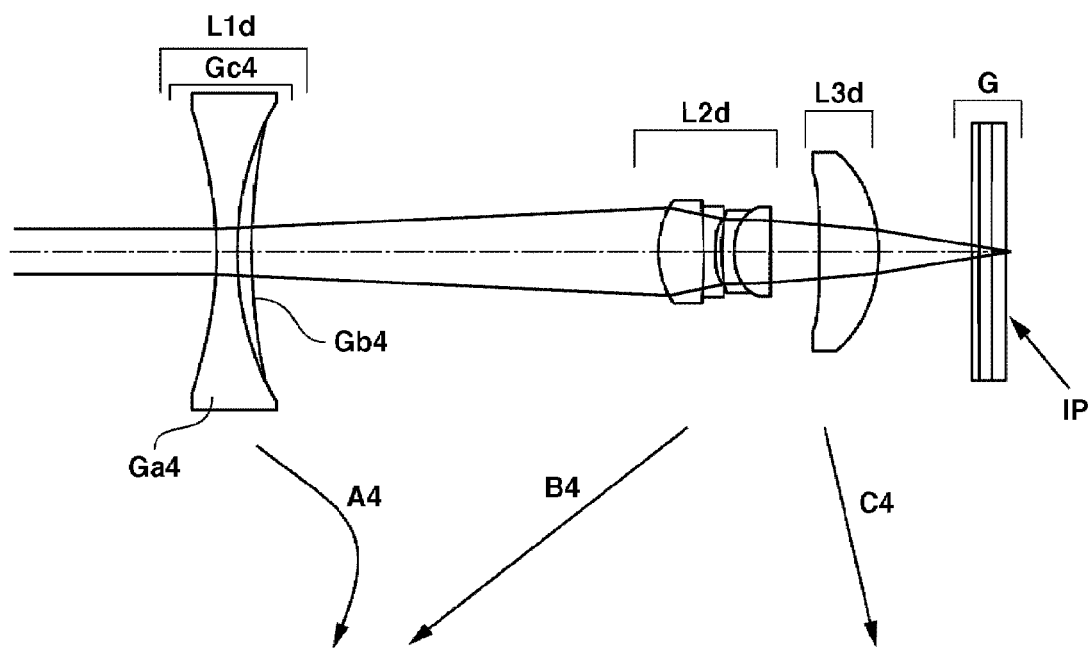
FIG. 7 is a cross section of a zoom lens according to a fourth exemplary embodiment of the present invention.
Figure 8A:
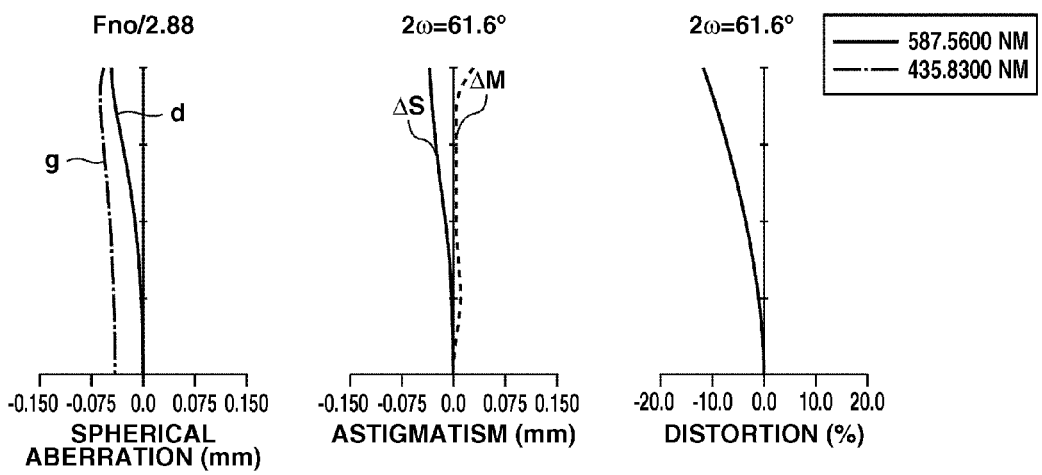
FIGS. 8A and 8B respectively illustrate an aberration chart at a wide-angle end and an aberration chart at a telephoto end for the zoom lens according to the fourth exemplary embodiment of the present invention.
Figure 8B:
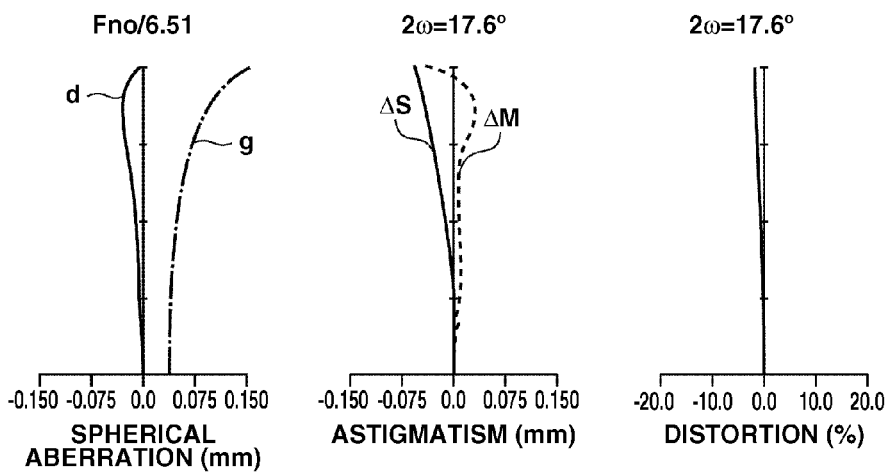

FIG. 7 is a cross section of a zoom lens at a wide-angle end according to a fourth exemplary embodiment of the present invention. FIG. 8A and FIG. 8B respectively illustrate an aberration chart at a wide-angle end and an aberration chart at a telephoto end for the zoom lens according to the fourth exemplary embodiment of the present invention. The fourth exemplary embodiment is directed to a zoom lens having a zoom ratio of about 3.9 and an aperture ratio ranging from about 2.9 to about 6.5.

Figure 9:
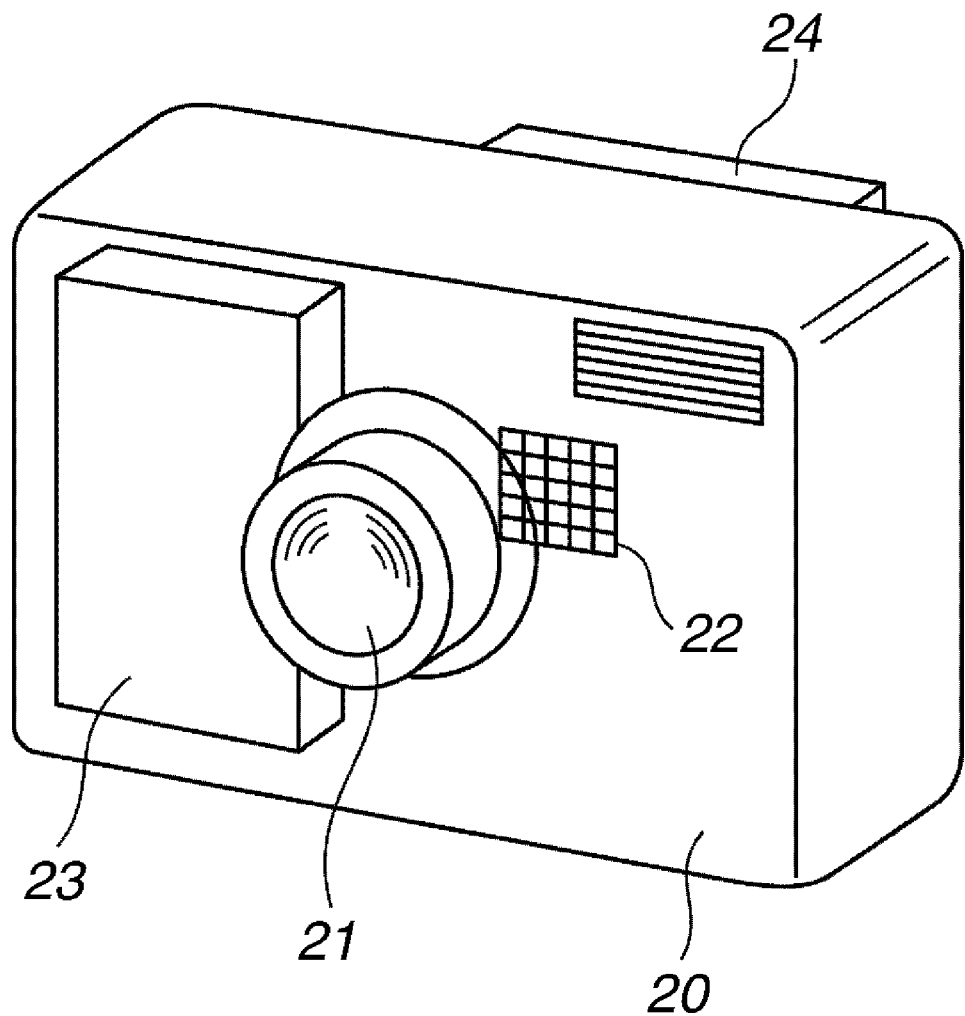
FIG. 9 is a diagram illustrating components of an image pickup apparatus according to an exemplary embodiment of the present invention.

FIG. 9 is a schematic diagram illustrating components of a digital still camera (image pickup apparatus) including a zoom lens according to an exemplary embodiment of the present invention.

The zoom lens according to each exemplary embodiment can be a photographic lens system for use with an image pickup apparatus. In using the zoom lens according to each of the exemplary embodiments of the present invention as an imaging optical system of a video camera or a digital still camera, an object image is formed on an imaging plane of a solid-state image sensor (photoelectric conversion element), such as a charge-coupled device (CCD) sensor or a complementary metal-oxide semiconductor (CMOS) sensor.

In each of the diagrams illustrating a cross section of a zoom lens, an object side (front side) is located at a left-hand portion of the drawing, and an image side (back side) is located at a right-hand portion thereof.

Referring to each of FIG. 1, FIG. 3, FIG. 5, and FIG. 7, a zoom lens includes a first lens unit L1a-d having a negative refractive power (optical power: an inverse of a focal length), a second lens unit L2a-d having a positive refractive power, and a third lens unit L3a-d having a positive refractive power. In each of FIG. 1, FIG. 3, FIG. 5, and FIG. 7, "G" denotes an optical block (glass block) that is equivalent to an optical filter, a face plate, a liquid crystal low-pass filter, an infrared-ray cut filter, or other type of optical filter as known by one of ordinary skill in the relevant arts. In addition, "IP" denotes an image plane, for example, on which an imaging plane of a solid-state image sensor (photoelectric conversion element) such as a CCD sensor or a CMOS sensor is positioned when the zoom lens is used as a photographic optical system for a video camera or a digital still camera.

In each of the aberration charts, "d" and "g" respectively denote d-line light (wavelength: 587.6 nm) and g-line light (wavelength: 435.8 nm). "ΔM" and "ΔS" respectively denote a meridional image plane and a sagittal image plane. "Fno" denotes an F number, and "ω" denotes a semifield angle.

The Y-axis in the spherical aberration's graph is entrance pupil radius, the Y-axis in the astigmatism's and distortion's graphs is image height.

The "wide-angle end" and the "telephoto end" each refer to a zoom position of a lens unit for zooming (the second lens units L2a-d or the second and third lens units L2a-d and L3a-d) is mechanically positioned on either of both ends of a range in which the lens unit can move along an optical axis.

In a zoom lens according to each exemplary embodiment, during zooming from the wide-angle end to the telephoto end, the first lens unit L1a-d moves with a locus convex towards the image side (A1-4), the second lens unit L2a-d moves monotonously towards the object side (B1-4), and the third lens unit L3a-d moves monotonously towards the image side (C1-4).

That is, in each exemplary embodiment, during zooming, the lens units are moved to change the interval between the lens units.

In the first, the second, and the fourth exemplary embodiments, focusing is performed by the third lens unit L3a, L3b, L3d.

In the third exemplary embodiment, focusing is performed by the first lens unit L1c.

The first lens unit L1a-d includes a composite optical element Gc1-4. The composite optical element Gc1-4 includes a lens element Ga1-4 made of a glass material or a resin and having a negative refractive power and a resin layer Gb1-4 having an optical characteristic different from that of the lens element Ga1-4 and laid on the lens element Ga1-4.

The resin layer Gb1-4 acts as a lens having a positive refractive power (acts to exert a refractive power).

At least one surface of the lens element Ga1-4 is aspheric.

The lens element Ga1-4 is formed by polishing a glass material or by molding a glass material.

At least one surface of the resin layer Gb1-4 is aspheric.

In each exemplary embodiment, various off-axis aberrations, e.g., astigmatism and distortion occurring in the case where the zoom lens has a large aperture ratio, are effectively corrected or reduced by introducing an aspheric lens in the lens unit.

The lens element Ga1-4 refers to an optical element (lens), such as a lens made of a glass material or a plastic material, which is a base plate having a surface on which a resin can be laid. The resin layer Gb1-4, which is laid on the lens element Ga1-4, can be previously molded as long as the resin layer Gb1-4 has an optical characteristic different from that of the lens element Ga1-4.

It is useful that the lens element Ga1-4 is made of a glass material in terms of material stability in manufacturing.

An exemplary configuration of a zoom lens according to each exemplary embodiment will be described below.

In a zoom lens according to the first exemplary embodiment illustrated in FIG. 1, during zooming from the wide-angle end to the telephoto end, the first lens unit L1a moves backward and forward with a locus convex towards the image side (A1), the second lens unit L2a moves towards the object side (B1), and the third lens unit L3a moves towards the image side (C1).

The zoom lens according to the first exemplary embodiment performs zooming by moving (B1) the second lens unit L2a. In addition, the first lens unit L1a moves backward and forward (A1) and the third lens unit L3a moves towards the image side (C1) to compensate for the movement of an image point caused by the variation of magnification.

In the first exemplary embodiment, the first lens unit L1a having a negative refractive power includes a negative lens (lens element) Ga1 whose both lens surfaces are concave and a resin layer Gb1 laid on the image side surface of the negative lens Ga1.

The second lens unit L2a includes, in order from the object side to the image side, a cemented lens obtained by cementing a positive lens whose both lens surfaces are convex and a negative lens whose both lens surfaces are concave, and a cemented lens obtained by cementing a negative meniscus lens whose lens surface on the image side is concave and a positive meniscus lens whose lens surface on the object side is convex.

The third lens unit L3a includes a positive meniscus lens whose lens surface on the image side is convex.

In a zoom lens according to the second exemplary embodiment illustrated in FIG. 3, during zooming from the wide-angle end to the telephoto end, the first lens unit L1b moves backward and forward with a locus convex towards the image side (A2). The second lens unit L2b moves towards the object side (B2) and the third lens unit L3b moves towards the image side (C2).

The second lens unit L2b moves (B2) to perform zooming. The first lens unit L1b moves backward and forward (A2), and the third lens unit L3b moves towards the image side (C2) to compensate for the movement of an image point caused by the variation of magnification.

In the second exemplary embodiment, the first lens unit L1b includes a negative lens (lens element Ga2) whose both lens surfaces are concave and a resin layer Gb2 laid on the image side surface of the negative lens Ga2.

The second lens unit L2b includes, in order from the object side to the image side, a positive lens whose both lens surfaces are convex, a negative lens whose both lens surfaces are concave, and a positive meniscus lens whose surface on the object side is convex.

The third lens unit L3b includes a positive lens whose both lens surfaces are convex.

In a zoom lens according to the third exemplary embodiment illustrated in FIG. 5, during zooming from the wide-angle end to the telephoto end, the first lens unit L1c moves backward and forward with a locus convex towards the image side (A3). The second lens unit L2c moves towards the object side (B3) and the third lens unit L3c moves towards the object side (C3).

The second lens unit L2c and the third lens unit L3c move (B3 and C3) to perform zooming. The first lens unit L1c moves backward and forward (A3) to compensate for the movement of an image point caused by the variation of magnification.

In the third exemplary embodiment, the first lens unit L1c includes a negative lens (lens element) Ga3 whose both lens surfaces are concave and a resin layer Gb3 laid on the image side surface of the negative lens Ga3.

The second lens unit L2c includes, in order from the object side to the image side, a positive lens whose both lens surfaces are convex and a negative meniscus lens whose lens surface on the object side is convex.

The third lens unit L3c includes a positive lens whose both lens surfaces are convex.

In a zoom lens according to the fourth exemplary embodiment illustrated in FIG. 7, during zooming from the wide-angle end to the telephoto end, the first lens unit L1d moves backward and forward with a locus convex towards the image side (A4). The second lens unit L2d moves towards the object side (B4) and the third lens unit L3d moves towards the image side (C4).

In the zoom lens according to the fourth exemplary embodiment, the second lens unit L2d moves (B4) to perform zooming. The first lens unit L1d moves backward and forward (A4) and the third lens unit L3d moves towards the image side (C4) to compensate for the movement of an image point caused by the variation of magnification.

In the fourth exemplary embodiment, the first lens unit L1d includes a negative lens (lens element) Ga4 whose both lens surfaces are concave and a resin layer Gb4 laid on the image side surface of the negative lens Ga4.

The second lens unit L2d includes, in order from the object side to the image side, a cemented lens obtained by cementing a positive lens whose both lens surfaces are convex and a negative lens whose both lens surfaces are concave, and a cemented lens obtained by cementing a negative meniscus lens whose lens surface on the image side is concave and a positive meniscus lens whose lens surface on the object side is convex.

The third lens unit L3d includes a positive meniscus lens whose lens surface on the image side is convex.

As described above, in each of the exemplary embodiments, the first lens unit L1a-d includes the composite optical element Gc1-4. The composite optical element Gc1-4 includes the lens element (negative lens) Ga1-4 and the resin layer Gb1-4 laid on the lens element Ga1-4.

In a case where the resin layer Gb1-4 is made of a resin curable by application of light or heat, for example, the resin layer Gb1-4 is generally produced by photo polymerization molding or thermal polymerization molding using a molding tool. Thus, the thickness of the resin layer Gb1-4 can easily be made thin. Accordingly, the entire optical system can be more easily downsized as compared to the case where the optical element is made of a glass material.

Accordingly, when the shape of the molding tool is previously made aspheric, the surface of the resin layer Gb1-4 (image side surface) opposite to a boundary surface between the lens element Ga1-4 and the resin layer Gb1-4 can be relatively easily made aspheric.

In each exemplary embodiment, the surface of the lens element Ga1-4 (object side surface) opposite to the boundary surface between the lens element Ga1-4 and the resin layer Gb1-4 has an aspheric shape. The boundary surface between the lens element Ga1-4 and the resin layer Gb1-4 can have an aspheric shape.

Other features of each of the exemplary embodiments will be described below.

In each of the exemplary embodiments, at least one of the following conditional expressions is satisfied.

$$0 < |(\phi_a/\nu_a + \phi_b/\nu_b)f_w| < 0.00123 \quad (1)$$

$$1.8 < |f_1/f_w| < 5.0 \quad (2)$$

$$-0.34 < (R_{11}+R_{12})/(R_{11}-R_{12}) < 0.20 \quad (3)$$

$$0.016 < t/f_w < 0.160 \quad (4)$$

$$0 < \nu_b < 30 \quad (5)$$

$$-0.6 < (R_{31}+R_{32})/(R_{31}-R_{32}) < 3.0 \quad (6)$$

$$0 < |f_w/f_3| < 0.6 \quad (7)$$

where "$\phi_a$" denotes a refractive power of the lens element Ga1-4, "$\nu_a$" denotes an Abbe number of a material of the lens element Ga1-4 with respect to d-line light, "$\phi_b$" denotes a refractive power of the resin layer Gb1-4, "$\nu_b$" denotes an Abbe number of a material of the resin layer Gb1-4 with respect to d-line light, "$f_w$" denotes a focal length of the zoom lens at the wide-angle end, "$f_1$" denotes a focal length of the first lens unit L1a-d, "$R_{11}$" denotes a radius of curvature of a surface of the composite optical element Gc1-4 on the object side, "$R_{12}$" denotes a radius of curvature of a surface of the composite optical element Gc1-4 on the image side, "t" denotes a thickness of the resin layer Gb1-4 in the optical axis direction, the third lens unit L3a-d includes one positive lens, "$R_{31}$" denotes a radius of curvature of a surface of the positive lens on the object side, "$R_{32}$" denotes a radius of curvature of a surface of the positive lens on the image side, and "$f_3$" denotes a focal length of the third lens unit L3a-d.

A technical significance of each conditional expression will be described below.

The conditional expression (1) is concerned with achromatism between the lens element Ga1-4 and the resin layer Gb1-4. If the upper limit of the conditional expression (1) is exceeded, achromatism cannot be effectively performed. Accordingly, in this case, it becomes difficult to appropriately correct chromatic aberration occurring with the first lens unit L1a-d, such as chromatic aberration of magnification at the wide-angle end and axial chromatic aberration at the telephoto end.

The conditional expression (2) is concerned with a ratio of focal length between the first lens unit L1a-d and the zoom lens.

If the lower limit of the conditional expression (2) is exceeded, the refractive power of the first lens unit L1a-d becomes very intense, thus causing large barrel-shaped distortion at the wide-angle end. On the other hand, if the upper limit of the conditional expression (2) is exceeded, a desired back focal length cannot be obtained.

The conditional expression (3) is concerned with the shape of both refractive surfaces of the composite optical element Gc1-4 (the lens element Ga1-4 and the resin layer Gb1-4) of the first lens unit L1a-d contacting the air.

If the lower limit of the conditional expression (3) is exceeded, a radius of curvature of the refractive surface on the object side becomes very small, thus causing large barrel-shaped distortion at the wide-angle end. On the other hand, if the upper limit of the conditional expression (3) is exceeded, a radius of curvature of the refractive surface on the image side becomes very small, thus causing large high-order coma and halo.

The conditional expression (4) is concerned with appropriately setting a thickness of the resin layer Gb1-4 laid on the lens element Ga1-4.

If the lower limit of the conditional expression (4) is exceeded, the resin layer Gb1-4 becomes too thin to obtain a sufficient positive refractive power to provide achromatism to the lens element Ga1-4, which exerts a main refractive power of the first lens unit L1a-d. Thus, a desired effect of achromatism cannot be obtained. On the other hand, if the upper limit of the conditional expression (4) is exceeded, the resin layer Gb1-4 becomes too thick to obtain an effect of downsizing the first lens unit L1a-d and the entire zoom lens.

In each of the exemplary embodiments, the composite optical element Gc1-4 included in the first lens unit L1a-d having a negative refractive power includes the lens element Ga1-4 and the resin layer Gb1-4. Both light-entrance and light-exit surfaces of the resin layer Gb1-4 are refractive surfaces. The resin layer Gb1-4 has a positive refractive power as a whole. The resin layer Gb1-4 is made of an optical material having a high dispersion characteristic, thus improving the effect of correction of chromatic aberration.

The conditional expression (5) is concerned with appropriately setting an Abbe number $v_b$ of the resin layer Gb1-4 with respect to d-line light.

If the upper limit of the conditional expression (5) is exceeded, achromatism cannot be effectively performed within the first lens unit L1a-d and a large amount of variation of chromatic aberration occurs during zooming. As a specific example of a resin satisfying the conditional expression (5), an ultraviolet (UV) curable resin ($N_d$=1.635, $v_b$=22.7, $\theta_{gF}$=0.69), among various kinds of resins, can be used. The resin is not limited to this as long as the resin satisfies the conditional expression (5).

The conditional expression (6) is concerned with the lens shape of the positive lens of the third lens unit L3a-d.

If the lower limit of the conditional expression (6) is exceeded, the positive refractive power of the positive lens on the object side becomes too strong to set off variation of aberration, such as field curvature, occurring at the first lens unit L1a-d during zooming. On the other hand, if the upper limit of the conditional expression (6) is exceeded, the positive refractive power of the positive lens on the image side becomes very strong, and a large amount of variation of field curvature occurs during focusing from an infinitely distant object to a closest object.

The conditional expression (7) is concerned with a ratio of focal length between the third lens unit L3a-d and the zoom lens at the wide-angle end. If the lower limit of the conditional expression (7) is exceeded, the refractive power of the third lens unit L3a-d becomes very small, and thus a composite refractive power of the first lens unit L1a-d and the second lens unit L2a-d is required to be set strong. Accordingly, in this case, it becomes difficult to correct off-axis aberration, such as distortion and field curvature, at the wide-angle end. On the other hand, if the upper limit of the conditional expression (7) is exceeded, the refractive power of the third lens unit L3a-d becomes very strong, and a large amount of variation of various aberrations related to a distance to an object occurs at the telephoto end.

In each of the exemplary embodiments, distortion can be corrected with a known electrical aberration correction method, for example.

In order to further correct aberration and to decrease an amount of aberration variation during zooming in each exemplary embodiment, the range of the values in the conditional expressions (1) through (7) can be altered as follows:

$$0<|(\phi_a/v_a+\phi_b/v_b)f_w|<0.00120 \tag{1a}$$

$$1.8<|f_1/f_w|<4.0 \tag{2a}$$

$$-0.34<(R_{11}+R_{12})/(R_{11}-R_{12})<0.10 \tag{3a}$$

$$0.050<t/f_w<0.120 \tag{4a}$$

$$10<v_b<27 \tag{5a}$$

$$-0.6<(R_{31}+R_{32})/(R_{31}-R_{32})<2.0 \tag{6a}$$

$$0.3<|f_w/f_3|<0.6 \tag{7a}$$

According to each of the exemplary embodiments, the components are set as described above to obtain a zoom lens useful in a photographing system using a solid-state image sensor.

According to each exemplary embodiment, a small-sized zoom lens having a small number of lenses, useful in a lens retraction type zoom lens, having a zoom ratio of about 3 to 4, capable of correcting or reducing various aberrations (e.g., chromatic aberration), and having a high optical performance can be obtained.

An exemplary embodiment of a digital camera (image pickup apparatus) that uses a zoom lens according to each exemplary embodiment as a shooting optical system will be described below with reference to FIG. 9.

Referring to FIG. 9, the digital camera includes a digital camera body 20 and a shooting optical system 21. The shooting optical system 21 includes a zoom lens according to any of the first to the fourth exemplary embodiments described above. The digital camera body 20 includes a solid-state image sensor (photoelectric conversion element) 22, such as a charge-coupled device (CCD) sensor or a complementary metal-oxide semiconductor (CMOS) sensor, configured to receive light forming an object image via the shooting optical system 21.

The digital camera body 20 further includes a recording unit 23 configured to record an object image received by the solid-state image sensor 22. The digital camera body 20 further includes a viewfinder 24 configured to allow a user to observe an object image displayed on a display element (not shown). The display element includes a liquid crystal display panel and displays an object image formed on the solid-state image sensor 22.

With a zoom lens according to an exemplary embodiment of the present invention applied to an image pickup apparatus, such as a digital camera, a small-sized image pickup apparatus having a high optical performance can be implemented.

Numerical examples 1 through 4 that respectively correspond to the first through the fourth exemplary embodiments will be set forth below. In each of the numerical examples 1 through 4, "i" denotes the order of a surface from the object side, "Ri" denotes a radius of curvature of the i-th lens surface (an i-th surface), "Di" denotes a lens thickness and an air interval between the i-th surface and the (i+1)th surface, "Ni" and "vi" respectively denotes a refractive index and an Abbe number of the i-th optical material with respect to d-line light. In addition, "W" denotes the wide-angle end, and "T" stands for the telephoto end.

Five surfaces closest to the image side in the numerical examples 1, 2, and 4 or four surfaces closest to the image side in the numerical example 3 constitute a glass member such as a face plate. In addition, "k" denotes a conic coefficient, and each of "A", "B", "C", "D", and "E" denote an aspheric coefficient. The aspheric shape is expressed as follows:

$$x = (h^2/R)/[1+\{1-(1+k)(h/R)^2\}^{1/2}] + Ah^4 + Bh^6 + Ch^8 + Dh^{10} + Eh^{12}$$

where "x" denotes a displacement from a surface vertex along the optical axis in a position at a height "h" from the optical axis, and "R" denotes a paraxial radius of curvature. Moreover, "e−0X" denotes "×10$^{-X}$". In addition, "f" denotes the focal length, "Fno" denotes the F number, and "ω" denotes the semifield angle.

Moreover, the relationship between each of the above-described conditional expressions and each of the exemplary embodiments are set forth in Table 1.

NUMERICAL EXAMPLE 1

| f = 6.0 mm-23.00 mm Fno = 2.88-6.54 ω = 30.81°-8.78° | | | |
|---|---|---|---|
| R1 = Aspheric | D1 = 1.00 | N1 = 1.487 | ν1 = 70.2 |
| R2 = 13.601 | D2 = 0.62 | N2 = 1.636 | ν2 = 22.7 |
| R3 = Aspheric | D3 = Variable | N3 = 1.860 | ν3 = 40.3 |
| R4 = Aspheric | D4 = 2.02 | N4 = 1.699 | ν4 = 30.1 |
| R5 = −35.271 | D5 = 0.50 | N5 = 1.801 | ν5 = 35.0 |
| R6 = 3.091 | D6 = 0.34 | N6 = 1.883 | ν6 = 40.8 |
| R7 = 18.036 | D7 = 0.50 | N7 = 1.487 | ν7 = 70.2 |
| R8 = 2.513 | D8 = 1.69 | N8 = 1.544 | ν8 = 70.6 |
| R9 = 296.852 | D9 = Variable | N9 = 1.494 | ν9 = 75.0 |
| R10 = Aspheric | D10 = 2.69 | N10 = 1.516 | ν10 = 64.1 |
| R11 = Aspheric | D11 = Variable | | |
| R12 = inf. ∞ | D12 = 0.35 | | |
| R13 = inf. ∞ | D13 = 0.50 | | |
| R14 = inf. ∞ | D14 = 0.10 | | |
| R15 = inf. ∞ | D15 = 0.50 | | |
| R16 = inf. ∞ | | | |

| | Focal Length | |
|---|---|---|
| Variable Space | W | T |
| D3 | 17.74 | 0.45 |
| D9 | 1.92 | 17.67 |
| D11 | 4.27 | 1.61 |

| Aspheric Coefficients | | | |
|---|---|---|---|
| R1 | 1/R = −6.316e−02 | k = 5.997e−01 | A = 4.262e−05 |
| | B = 7.705e−06 | C = −1.510e−07 | D = 8.728e−10 |
| | E = 3.593e−12 | | |
| R3 | 1/R = 4.096e−02 | k = 1.020e+01 | A = −1.577e−04 |
| | B = 2.317e−06 | C = 1.514e−07 | D = −8.563e−09 |
| | E = 1.039e−10 | | |
| R4 | 1/R = 2.253e−01 | k = −4.037e−01 | A = 3.234e−05 |
| | B = −1.034e−06 | C = 2.875e−06 | D = −4.716e−07 |
| | E = 0.000e+00 | | |
| R10 | 1/R = −1.104e−02 | k = 0.000e+00 | A = −6.470e−04 |
| | B = 1.042e−05 | C = −2.700e−06 | D = −1.171e−08 |
| | E = −2.327e−11 | | |
| R11 | 1/R = −1.558e−01 | k = −4.583e−01 | A = 7.221e−05 |
| | B = −1.126e−05 | C = −7.177e−07 | D = −2.560e−08 |
| | E = 4.476e−13 | | |

NUMERICAL EXAMPLE 2

| f = 6.0 mm-23.00 mm Fno = 2.88-6.50 ω = 31.29°-8.96° | | | |
|---|---|---|---|
| R1 = Aspheric | D1 = 1.00 | N1 = 1.487 | ν1 = 70.2 |
| R2 = 15.047 | D2 = 0.38 | N2 = 2.104 | ν2 = 17.1 |
| R3 = Aspheric | D3 = Variable | N3 = 1.860 | ν3 = 40.3 |
| R4 = Aspheric | D4 = 2.52 | N4 = 1.741 | ν4 = 27.8 |
| R5 = −7.734 | D5 = 0.50 | N5 = 1.863 | ν5 = 40.8 |
| R6 = 3.319 | D6 = 1.60 | N6 = 1.487 | ν6 = 70.2 |
| R7 = 9.307 | D7 = 1.35 | N7 = 1.544 | ν7 = 70.6 |
| R8 = 20.467 | D8 = Variable | N8 = 1.494 | ν8 = 75.0 |
| R9 = Aspheric | D9 = 2.19 | N9 = 1.516 | ν9 = 64.1 |
| R10 = Aspheric | D10 = Variable | | |
| R11 = inf. ∞ | D11 = 0.35 | | |
| R12 = inf. ∞ | D12 = 0.50 | | |
| R13 = inf. ∞ | D13 = 0.10 | | |
| R14 = inf. ∞ | D14 = 0.50 | | |
| R15 = inf. ∞ | | | |

| | Focal Length | |
|---|---|---|
| Variable Space | W | T |
| D3 | 18.28 | 0.45 |
| D8 | 1.23 | 17.17 |
| D10 | 4.14 | 1.61 |

| Aspheric Coefficients | | | |
|---|---|---|---|
| R1 | 1/R = −6.180e−02 | k = 7.072e−01 | A = 9.149e−05 |
| | B = 4.656e−06 | C = −9.418e−08 | D = 9.380e−10 |
| | E = −3.438e−12 | | |
| R3 | 1/R = 5.135e−02 | k = 2.457e+00 | A = −6.910e−05 |
| | B = 5.997e−07 | C = 5.707e−08 | D = −2.061e−09 |
| | E = 2−195e−11 | | |
| R4 | 1/R = 2.178e−01 | k = −4.327e−01 | A = 1.323e−06 |
| | B = −2.781e−05 | C = 7.799e−06 | D = −9.614e−07 |
| | E = 0.000e+00 | | |
| R9 | 1/R = 1.102e−02 | k = 0.000e+00 | A = 1.325e−04 |
| | B = 3.039e−06 | C = −1.384e−06 | D = 8.154e−08 |
| | E = −3.525e−12 | | |
| R10 | 1/R = −1.299e−01 | k = −1.004e+00 | A = 4.196e−04 |
| | B = 9.186e−06 | C = −2.859e−06 | D = 1.256e−07 |
| | E = 2.228e−12 | | |

NUMERICAL EXAMPLE 3

| f = 6.5 mm-24.2 mm Fno = 2.92-5.67 ω = 28.77°-8.34° | | | |
|---|---|---|---|
| R1 = Aspheric | D1 = 0.70 | N1 = 1.589 | ν1 = 61.1 |
| R2 = 8.157 | D2 = 0.51 | N2 = 1.636 | ν2 = 22.7 |
| R3 = Aspheric | D3 = Variable | N3 = 1.772 | ν3 = 49.6 |
| R4 = Aspheric | D4 = 2.84 | N4 = 1.762 | ν4 = 26.5 |
| R5 = Aspheric | D5 = 0.10 | N5 = 1.564 | ν5 = 60.7 |
| R6 = 40.192 | D6 = 0.50 | N6 = 1.544 | ν6 = 70.6 |
| R7 = 4.169 | D7 = Variable | N7 = 1.516 | ν7 = 64.1 |
| R8 = Aspheric | D8 = 2.93 | | |
| R9 = Aspheric | D9 = Variable | | |
| R10 = inf. ∞ | D10 = 0.26 | | |
| R11 = inf. ∞ | D11 = 0.50 | | |
| R12 = inf. ∞ | D12 = 0.50 | | |
| R13 = inf. ∞ | | | |

| | Focal Length | |
|---|---|---|
| Variable Space | W | T |
| D3 | 13.84 | 0.07 |
| D7 | 1.63 | 2.93 |
| D9 | 7.70 | 22.21 |

-continued f = 6.5 mm-24.2 mm Fno = 2.92-5.67 ω = 28.77°-8.34°

Aspheric Coefficients

| R1 | 1/R = −8.214e−02 | k = 1.460e+00 | A = 4.960e−04 |
|---|---|---|---|
|  | B = −2.734e−05 | C = 2.081e−06 | D1 = −4.633e−08 |
|  | E = 0.000e+00 |  |  |
| R3 | 1/R = 5.922e−02 | k = −1.897e+00 | A = 3.581e−04 |
|  | B = −4.476e−05 | C = 4.087e−06 | D = −1.084e−07 |
|  | E = 0.000e+00 |  |  |
| R4 | 1/R = 1.863e−01 | k = −2.917e+00 | A = 1.808e−03 |
|  | B = −5.550e−05 | C = 0.000e+00 | D = 0.000e+00 |
|  | E = 0.000e+00 |  |  |
| R5 | 1/R = −4.466e−02 | k = −2.762e+01 | A = 3.572e−04 |
|  | B = −5.728e−05 | C = 0.000e+00 | D = 0.000e+00 |
|  | E = 0.000e+00 |  |  |
| R8 | 1/R = 1.194e−01 | k = 4.342e+00 | A = 1.110e−04 |
|  | B = −6.759e−05 | C = 3.216e−06 | D = −3.312e−07 |
|  | E = 0.000e+00 |  |  |
| R9 | 1/R = −3.146e−02 | k = −5.820e+01 | A = 5.378e−04 |
|  | B = 2.322e−05 | C = −3.631e−07 | D = 3.675e−07 |
|  | E = 0.000e+00 |  |  |

NUMERICAL EXAMPLE 4 f = 6.0 mm-23.0 mm Fno = 2.88-6.51 ω = 30.81°-8.79°

| R1 = Aspheric | D1 = 1.00 | N1 = 1.497 | ν1 = 81.5 |
|---|---|---|---|
| R2 = 15.507 | D2 = 0.53 | N2 = 1.636 | ν2 = 22.7 |
| R3 = Aspheric | D3 = Variable | N3 = 1.860 | ν3 = 40.3 |
| R4 = Aspheric | D4 = 2.02 | N4 = 1.699 | ν4 = 30.1 |
| R5 = −37.129 | D5 = 0.50 | N5 = 1.801 | ν5 = 35.0 |
| R6 = 3.069 | D6 = 0.35 | N6 = 1.883 | ν6 = 40.8 |
| R7 = 19.175 | D7 = 0.50 | N7 = 1.487 | ν7 = 70.2 |
| R8 = 2.511 | D8 = 1.69 | N8 = 1.544 | ν8 = 70.6 |
| R9 = 2330.994 | D9 = Variable | N9 = 1.494 | ν9 = 75.0 |
| R10 = Aspheric | D10 = 2.69 | N10 = 1.516 | ν10 = 64.1 |

-continued f = 6.0 mm-23.0 mm Fno = 2.88-6.51 ω = 30.81°-8.79°

| R11 = Aspheric | D11 = Variable |
|---|---|
| R12 = inf. ∞ | D11 = 0.35 |
| R13 = inf. ∞ | D13 = 0.50 |
| R14 = inf. ∞ | D14 = 0.10 |
| R15 = inf. ∞ | D15 = 0.50 |
| R16 = inf. ∞ |  |

|  | Focal Length ||
|---|---|---|
| Variable Space | W | T |
| D3 | 17.81 | 0.45 |
| D9 | 1.92 | 17.64 |
| D11 | 4.28 | 1.61 |

Aspheric Coefficients

| R1 | 1/R = −6.182e−02 | k = 7.819e−01 | A = 2.863e−05 |
|---|---|---|---|
|  | B = 7.667e−06 | C = −1.439e−07 | D = 8.557e−10 |
|  | E = 2.882e−12 |  |  |
| R3 | 1/R = 3.784e−02 | k = 1.089e+01 | A = −1.595e−04 |
|  | B = 2.438e−06 | C = 1.537e−07 | D = −8.021e−09 |
|  | E = 9.777e−11 |  |  |
| R4 | 1/R = 2.267e−01 | k = −4.022e−01 | A = 3.603e−05 |
|  | B = −3.054e−06 | C = 3.237e−06 | D = −4.902e−07 |
|  | E = 0.000e+00 |  |  |
| R10 | 1/R = −1.009e−02 | k = 0.000e+00 | A = −6.390e−04 |
|  | B = 1.375e−05 | C = −2.763e−06 | D = −5.656e−09 |
|  | E = −2.327e−11 |  |  |
| R11 | 1/R = 1.545e−01 | k = −4.614e−01 | A = 5.106e−05 |
|  | B = −8.326e−06 | C = −7.531e−07 | D1 = −2.402e−08 |
|  | E = 4.476e−13 |  |  |

TABLE 1

|  |  |  | Numerical Example ||||
|---|---|---|---|---|---|---|
|  | Upr Lmt | Lwr Lmt | 1 | 2 | 3 | 4 |
| (1) | 0.0000 | 0.0012 | 1.64e−04 | 7.20e−04 | 1.19e−03 | 1.08e−04 |
| (2) | 1.80 | 5.00 | 3.62 | 3.65 | 1.91 | 3.63 |
| (3) | −0.34 | 0.20 | −0.21 | −0.09 | −0.16 | −0.24 |
| (4) | 0.016 | 0.160 | 0.105 | 0.065 | 0.079 | 0.089 |
| (5) | 0.0 | 30.0 | 22.7 | 17.1 | 22.7 | 22.7 |
| (6) | −0.60 | 3.00 | 1.15 | 0.84 | −0.58 | 1.14 |
| (7) | 0.00 | 0.60 | 0.42 | 0.41 | 0.53 | 0.42 |

In Table 1, the conditional expressions are as follows.

(1): $|(\phi_a/\nu_a + \phi_b/\nu_b)f_w|$ (2): $|f1/fw|$ (3): $(R_{11} + R_{12})/(R_{11} - R_{12})$ (4): $t/f_w$ (5): $\nu_b$ (6): $(R_{31} + R_{32})/(R_{31} - R_{32})$ (7): $|f_w/f_3|$ While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-235427 filed Aug. 31, 2006, which is hereby incorporated by reference herein in its entirety.

What is claimed is:

1. A zoom lens comprising, in order from an object side to an image side:
a first lens unit having a negative refractive power;
a second lens unit having a positive refractive power; and
a third lens unit having a positive refractive power,
wherein an interval between the first lens unit and the second lens unit and an interval between the second lens unit and the third lens unit vary during zooming,
wherein the first lens unit includes a composite optical element,
wherein the composite optical element includes a lens element and a resin layer having an optical characteristic different from that of the lens element and laid on the lens element, and
wherein a refractive power of the lens element ($\phi_a$), an Abbe number of a material of the lens element with respect to d-line light ($\nu_a$), a refractive power of the resin layer ($\phi_b$), an Abbe number of a material of the resin layer with respect to d-line light ($\nu_b$), and a focal length of the zoom lens at a wide-angle end ($f_w$) satisfy the following condition:

$$0 < |(\phi_a/\nu_a + \phi_b/\nu_b)f_w| < 0.00123.$$

2. The zoom lens according to claim 1, wherein a thickness of the resin layer in an optical axis direction (t) and the focal length of the zoom lens at the wide-angle end ($f_w$) satisfy the following condition:

$$0.016 < t/fw < 0.160.$$

3. The zoom lens according to claim 1, wherein the Abbe number of the material of the resin layer with respect to d-line light ($\nu_b$) satisfies the following condition:

$$0 < \nu_b < 30.$$

4. The zoom lens according to claim 1, wherein the third lens unit includes one positive lens, and
wherein a radius of curvature of a surface of the positive lens on the object side ($R_{31}$) and a radius of curvature of a surface of the positive lens on the image side ($R_{32}$) satisfy the following condition:

$$-0.6 < (R_{31}+R_{32})/(R_{31}-R_{32}) < 3.0.$$

5. The zoom lens according to claim 1, wherein a focal length of the third lens unit ($f_3$) and the focal length of the zoom lens at the wide-angle end ($f_w$) satisfy the following condition:

$$0 < |f_w/f_3| < 0.6.$$

6. The zoom lens according to claim 1, wherein the lens element has a negative refractive power, and
wherein the resin layer has a positive refractive power.

7. The zoom lens according to claim 1, wherein the zoom lens is configured to form an image on a photoelectrical conversion element.

8. An image pickup apparatus comprising:
the zoom lens according to claim 1; and
a photoelectrical conversion element configured to receive an image formed by the zoom lens.

9. A zoom lens comprising, in order from an object side to an image side:
a first lens unit having a negative refractive power;
a second lens unit having a positive refractive power; and
a third lens unit having a positive refractive power,
wherein an interval between the first lens unit and the second lens unit and an interval between the second lens unit and the third lens unit vary during zooming,
wherein the first lens unit includes a composite optical element,
wherein the composite optical element includes a lens element made of a glass material and a resin layer having an optical characteristic different from that of the lens element and laid on the lens element, and
wherein a focal length of the first lens unit ($f_1$), a focal length of the zoom lens at a wide-angle end ($f_w$), a radius of curvature of a surface of the composite optical element facing the object side ($R_{11}$), and a radius of curvature of a surface of the composite optical element facing the image side ($R_{12}$) satisfy the following conditions:

$$1.8 < |f_1/f_w| < 5.0, \text{ and}$$

$$-0.34 < (R_{11}+R_{12})/(R_{11}-R_{12}) < 0.20.$$

10. The zoom lens according to claim 9, wherein a thickness of the resin layer in an optical axis direction (t) and the focal length of the zoom lens at the wide-angle end ($f_w$) satisfy the following condition:

$$0.016 < t/fw < 0.160.$$

11. The zoom lens according to claim 9, wherein an Abbe number of a material of the resin layer with respect to d-line light ($\nu_b$) satisfies the following condition:

$$0 < \nu_b < 30.$$

12. The zoom lens according to claim 9, wherein the third lens unit includes one positive lens, and
wherein a radius of curvature of a surface of the positive lens on the object side ($R_{31}$) and a radius of curvature of a surface of the positive lens on the image side ($R_{32}$) satisfy the following condition:

$$-0.6 < (R_{31}+R_{32})/(R_{31}-R_{32}) < 3.0.$$

13. The zoom lens according to claim 9, wherein a focal length of the third lens unit ($f_3$) and the focal length of the zoom lens at the wide-angle end ($f_w$) satisfy the following condition:

$$0 < |f_w/f_3| < 0.6.$$

14. The zoom lens according to claim 9, wherein the lens element has a negative refractive power, and
wherein the resin layer has a positive refractive power.

15. The zoom lens according to claim 9, wherein the zoom lens is configured to form an image on a photoelectrical conversion element.

16. An image pickup apparatus comprising:
the zoom lens according to claim 9; and
a photoelectrical conversion element configured to receive an image formed by the zoom lens.

* * * * *